United States Patent [19]

Ross

[11] Patent Number: 4,462,078

[45] Date of Patent: Jul. 24, 1984

[54] COMPUTER PROGRAM PROTECTION METHOD

[76] Inventor: Ron Ross, P.O. Box 175, Princeton Junction, N.J. 08550

[21] Appl. No.: 404,135

[22] Filed: Aug. 2, 1982

[51] Int. Cl.³ .............................................. G06F 9/00
[52] U.S. Cl. ..................................................... 364/300
[58] Field of Search ... 364/200 MS File, 900 MS File, 364/300; 178/22.01, 22.08

[56] References Cited

U.S. PATENT DOCUMENTS 4,278,837  7/1981  Best ................................. 364/900 X

*Primary Examiner*—Raulfe B. Zache
*Attorney, Agent, or Firm*—Charles I. Brodsky

[57] ABSTRACT

A computer program protection method which permits copying of the program by a user, but which incorporates a novel information coding technique to prevent operational response by the computer using a copy.

3 Claims, No Drawings

COMPUTER PROGRAM PROTECTION METHOD

FIELD OF THE INVENTION

This invention relates to a computer program protection method and, more particularly, to one which is especially attractive in the micro-computer field.

BACKGROUND OF THE INVENTION

As is well known and understood, one of the major problems in the desktop computer industry today revolves around the copying of computer programs from an original purchase. That is, it is very well known that after a person might purchase a computer program, he then shares it with his friends by simply copying that program onto a second recording medium for use by his colleagues. In this manner, the initial cost of the program can be shared amongst ultimate users, and the result is a significant loss in revenue to the software developer. With the most common type of recording medium being a standard floppy disk, the present day techniques of copying are very easily accomplished using either a "two-disk" drive machine, or even a single disk drive machine after the program to be copied is stored in the computer memory.

As is also well known and understood, attempts at correcting this problem have revolved around proposals to prevent the copying of the program, or at the very least, to make copying extremely difficult. However, even such techniques as are available have been shown to be not "fool-proof", and that a reasonably good systems programmer can continue to write a program to enable his hardware to copy the developed program originally purchased by his compatriots.

DESCRIPTION OF THE INVENTION

The computer program protection method of the present invention, on the other hand, significantly distinguishes over those protection methods previously proposed in that it permits the computer program to be copied, but further incorporates a novel information coding technique which has the ability to prevent the computer responding in an operational manner, so as to effectively defeat, in its entirety, the copying established. In accordance with the invention, the computer program is designed to include an instruction to write a coded information at a particular location in the source recording medium utilized by the software developer, and which is characterized by a positional inability to write such coded information at that location. The recording medium of the copier, however, is not so characterized by a comparable positional inability, to the extent that the information code will be printed there, pursuant to the program instruction. The computer itself, on the other hand, is arranged to recognize the presence of that printed code as being of a program copy, and to respond by rejecting the programmed instructions.

More specifically, the technology exists at the present time to fabricate the information carrying medium —be it floppy disk, magnetic tape, video tape, etc.—so that it can be "read from" only in certain locations, and not be able to be "written upon". A location at a track of a floppy disk, for example, can be so fabricated as to be unresponsive to an instruction to write a code at that location, even though the computer program directs that such operation is to occur,—that the disk will not be able to record information attempted to be written into that track by the recording mechanisms of commercially available desk-top computer equipment. Only information transmitted by heavy duty, or specialized equipment generally available to the software developer or the medium manufacturer will be of the type available to write information at these locations. With these type recording mediums available only to the software developer or medium manufacturer, and not to the general public, the following will be seen to be an appropriate scenario of events:

(a) The software developer or medium manufacturer imparts a first coded signal to the particular location in the source recording medium which is characterized by a positional inability to write other informations there using standard desk-top computer hardware.

(b) The software developer then formulates a program for the standard computer hardware which includes an instruction to write a second, different coded information at that same particular location, and that entire program is then written onto the recording medium that the software developer is selling.

(c) Because of the characteristics of the recording medium, the second different coded information would not be laid down at the specified track location.

(d) When the copier sets out to copy the computer program, there is available to him a recording medium which is not characterized by the positional inability to write coded information at any location.

(e) As the program is being copied, also being copied is the instruction to write the second coded information at the particular location of interest.

(f) When the copied program is attempted to control the user's desk-top computer, the program will write a second, different coded information at the particular location. The program subsequently will read the particular location, and instead of seeing the coded information originally inserted by the manufacturer, will see, instead, the different information written into the record in accordance with the program instruction.

(g) As the computer is designed to respond only to the presence of the intended information code in that track location, the presence there of a different code serves to render the computer dis-functional. In other words whereas the user has copied the entire software program, because the new medium on which the copy is made can be written on by the standard methods at the particular location, the computer program will write over the original information code, and the effect of the copying is nullified.

With the following understood, it will be readily apparent that several ways exist so as to prepare the recording medium to respond to a written instruction to insert the original information code, but to ignore the writing instructions given to the user of the copy. Associated with this will be a recognition that such insertion of the original code is to be accomplished by means not generally available to the consuming user. Thus, for a software developer using a floppy disk medium, different emulsions can be imparted to the disk, the most parts of which could be written upon using apparatus generally available to all computer users, but where the original code insertion can be written only with the intensified writing mechanisms available to the developer or manufacturer and not generally available to the standard equipment found by the computer owner. In some respects, this can be effected using emulsions of different composition, but can also be done with emulsions of the same composition but of different consistencies. As will be appreciated, the protection method does not depend upon how the different characteristics are laid down, or their physical dimensions or their locations—but, solely, on their being both present only on the master recording medium produced by the software developer. In any event, the situation is one where the copier follows exactly the computer program, but later finds an inability to have his equipment operationally respond to the program, and because the ability to respond imparts a coded information which should not be present on the recorded medium because of the design of that medium which does not prevent the changing of the coded information there from the start.

While there has been described what is considered to be a preferred embodiment of incorporating the computer protection method of the invention, it will be readily apparent to those skilled in the art that modifications may be made without departing from the scope of the teachings herein of creating an area on a floppy disk, magnetic tape, or video tape, etc. recording medium that has known information already encoded on it, and having the computer program try to re-write information on that particular identified location; and by then attempting to read back that information which was recorded to determine if it is the original information or the second, re-written information—if the second information is found, the computer program can dis-function. For at least such reason, therefore, resort should be had to the claims appended hereto for a complete understanding of the scope of the invention.

I claim:

1. In a computer program protection method intended to distinguish between computer programs recorded on a bona fide recording medium and corresponding programs copied from such bona fide medium onto a similar recording medium, the steps of:
   a. Writing a code signal at a predetermined location in said information recording medium in accordance with an instruction incorporated within the program to be protected;
   b. Verifying in the computer the code signal stored at said predetermined location; and
   c. The step of utilizing as said bona fide recording medium, a medium which is unresponsive to such instruction to write said code signal at said predetermined location.

2. The protection method of claim 1 wherein there is additionally included the step of disabling the computer upon the verification of the storing of said code signal at said predetermined location.

3. The protection method of claim 2 wherein said recording medium utilization step utilizes a bona fide recording medium constrained to reject program instructions at said predetermined location of a characteristic sufficient to carry out said instructions at said locations on a recording medium where said computer program is attempted to be similarly copied.

* * * * *

Notice of Adverse Decision in Interference

In Interference No. 101,445, involving Patent No. 4,462,078, R. Ross, COMPUTER PROGRAM PROTECTION METHOD, final judgment adverse to the patentee was rendered Apr. 24, 1986, as to claims 1-3.

[*Official Gazette August 12, 1986.*]